No. 806,398. PATENTED DEC. 5, 1905.
T. H. CRAWFORD.
CHUCK.
APPLICATION FILED AUG. 22, 1905.
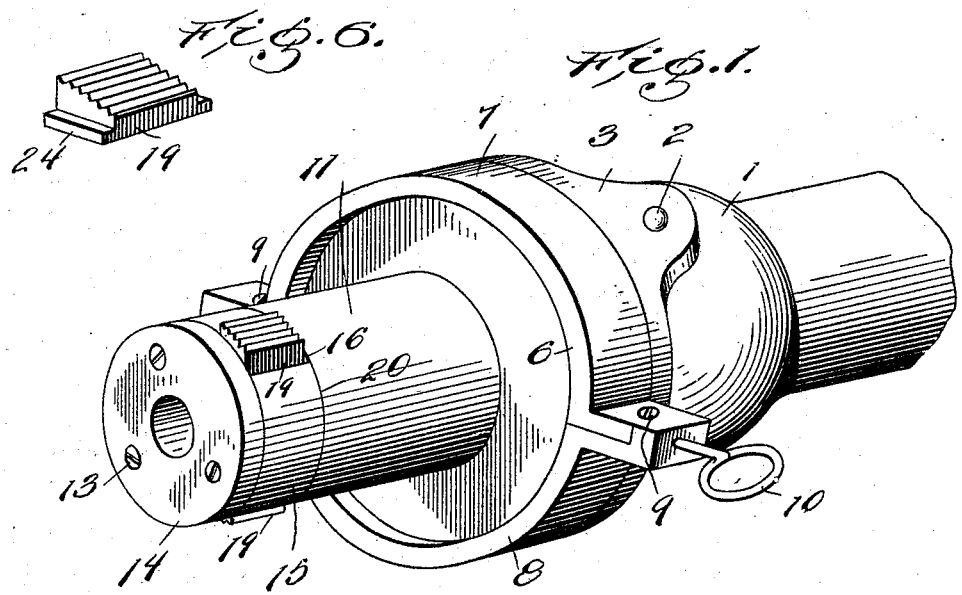
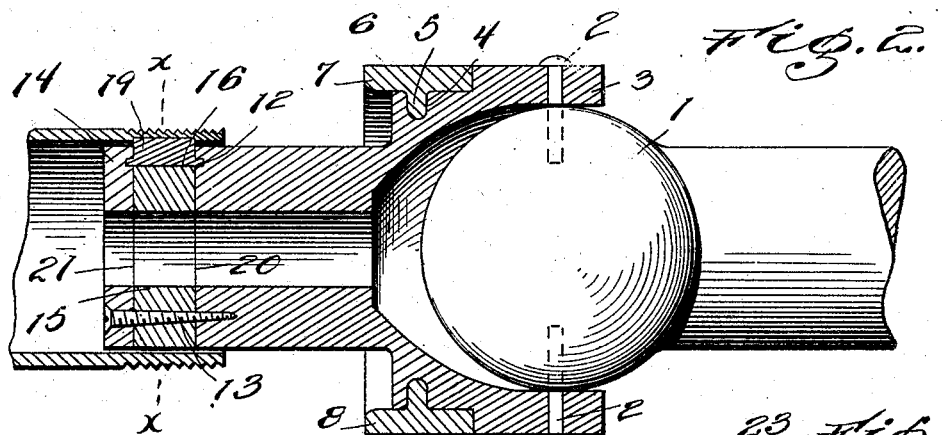
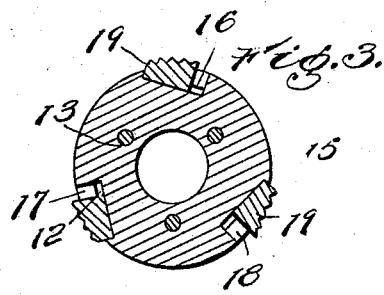
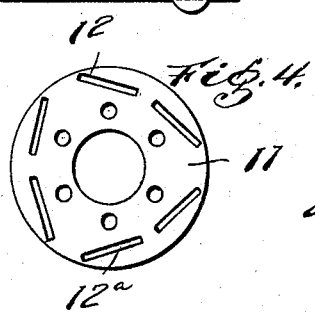
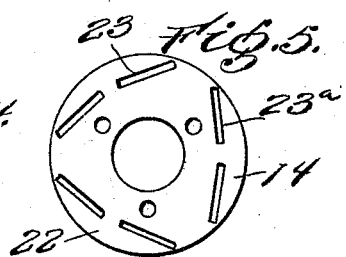
Witnesses
G. R. Thomas
H. Welsh
Inventor
T. H. Crawford
By Swift & Co.
Attorneys

UNITED STATES PATENT OFFICE.

THOMAS H. CRAWFORD, OF EATON, INDIANA.

CHUCK.

No. 806,398. Specification of Letters Patent. Patented Dec. 5, 1905.

Application filed August 22, 1905. Serial No. 275,326.

*To all whom it may concern:*

Be it known that I, THOMAS H. CRAWFORD, a citizen of the United States, residing at Eaton, in the county of Delaware and State of Indiana, have invented a new and useful Chuck; and I do hereby declare the following to be a full, clear, and exact description of the invention, such as will enable others skilled in the art to which it appertains to make and use the same.

This invention relates to chucks comprising means for unscrewing or screwing together large gas-mains or metallic pipes of any description.

In the old way an engine is employed having a swinging shaft to which a chuck is attached. This chuck is adapted to grip upon the outside of the collar upon the end of the pipe, and when the chuck is turned said collar will invariably back off the end of the pipe instead of the collar and pipe backing together, while in the present invention the chuck is adapted to be inserted within the end of the pipe and collar, and thus by turning in one direction the toothed sliding blocks which are mounted circumferentially around the chuck will expand and bite themselves into the inner circumference of the pipe, which will cause the pipe to be secured to the adjacent pipe. When it is desired to detach the chuck after screwing the pipe, just reverse the rotary movement of the chuck and the toothed sliding blocks will contract and withdraw themselves from the inner circumference of the pipe, thus allowing the chuck to be detached.

This invention is preferably used for unscrewing pipes, because it avoids the disadvantages, as above stated, in the old method. When it is desired to unscrew pipes, the toothed sliding blocks are reversed and the face of the clamping-head opposite to the face used for screwing the pipes together is employed by reversing said clamping-head. In the present invention the chuck is connected to a common ordinary knuckle, which is connected to the swinging shaft of an engine, and by rotating said knuckle in one direction or the other the pipes may be disconnected or joined together, as desired.

Other and further objects and advantages of the invention will be hereinafter set forth, and the novel features thereof defined in the appended claims.

My invention is illustrated in the accompanying drawings, which, with the figures of reference marked thereon, form a part of this application, and in which—

Figure 1 is a perspective view of the chuck, showing the toothed sliding blocks in position for screwing pipes or gas-mains together. Fig. 2 is a longitudinal sectional view. Fig. 3 is a cross-sectional view on the line X X of Fig. 2. Figs. 4 and 5 are detail views showing the apertures for holding the sliding blocks.

Referring more particularly to the accompanying drawings by reference-numerals, 1 designates a common ordinary knuckle which is adapted to be attached to the swinging shaft of an engine, said engine forming no part of the present invention. Adapted to fit over and secured to said knuckle by means of thumb-screws 2 is a shell 3, forming the main body portion of a chuck and having a circumferential rectangular groove 4 upon the outer face thereof adapted to receive a rib 5 of a collar 6, formed in two parts 7 and 8, which are securely held together by means of suitable bolts 9. Projecting from each side of this collar are suitable handles 10, designed for holding said chuck while the same is turning.

Projecting from one side of the chuck is a cylindrical portion 11, the face of which is provided with a double set of recesses 12 and 12ª, each set comprising three in number, and also provided upon said face is a series of threaded apertures adapted to receive suitable bolts 13 for the purpose of securely holding the clamping-head 14 in the correct relation, which will be hereinafter set forth. Adjacent to each recess and adapted to correspond therewith is one of said threaded apertures. Adapted to be clamped between the face of said cylindrical portion 11 and the clamping-head 14 is a disk 15, having suitable apertures to allow said bolts 13 to pass therethrough. Said disk 15 is recessed, as shown at 16, 17, and 18, for the purpose of receiving the toothed sliding blocks 19. The faces of these recesses 16, 17, and 18 are adapted to correspond with the first set of recesses 12 in the face of the cylindrical portion 11— that is, when the face 20 of the disk 15 is placed adjacent to the face of the cylindrical portion 11 and the chuck is turned toward its right the toothed sliding blocks 19 will have a tendency to expand and bite themselves upon the inner circumference of the pipes, thus allowing the pipes to be screwed together.

Adapted to be placed adjacent to the face 21 of the disk 15 is the clamping-head 14, having suitable apertures to also allow the bolts 13 to be inserted therethrough for engagement with the cylindrical portion 11. The face 22 of the clamping-head 14 is provided with a double set of recesses 23 and $23^a$. Said recesses 23 are adapted to register with the recesses 12 upon the face of the cylindrical portion 11 and also adapted to receive a rib 24, projecting laterally from the toothed sliding blocks 19.

When it is desired to unscrew a pipe or main, the bolts 13 are removed to allow the toothed sliding blocks to be reversed and the disk 15 turned over, so as to allow the face 21 to be adjacent to the face of the cylindrical portion 11, which when in this position will cause the faces of the recesses 16, 17, and 18 to register with the recesses in the face of the cylindrical portion 11, and by the reversible and peculiar movement of the toothed sliding blocks the same will have a tendency to expand and bite themselves into the inner circumference of the pipe for the purpose of unscrewing the same. When the disk 15 is thus placed, the face 22 of the clamping-head will be placed adjacent to the face 20 of the disk 15, thus allowing the recesses $23^a$ in said faces to register with the recesses $12^a$ in the face of the cylindrical portion 11 and also adapted to receive the rib projecting laterally from the side of the toothed sliding block.

It will be plainly seen how by referring to the accompanying drawings, in connection with the description just given, pipes or gas-mains will be unscrewed.

Having thus fully described my invention, what I claim as new, and desire to secure by Letters Patent, is—

1. A device of the character described, comprising a cylindrical shell, a swiveled collar mounted thereon, having suitable handles, a cylindrical portion projecting from one side of said shell, the face of which has recesses, a clamping-head, a disk adapted to be clamped between the face of said cylindrical portion and said clamping-head, recesses provided in the cylindrical portion of said disk, and means mounted in said recesses so as to expand, substantially as described.

2. A device of the character described, comprising a cylindrical shell, a swiveled collar mounted thereon, having suitable handles, a cylindrical portion projecting from one side of said shell, the face of which has recesses, a clamping-head, a disk adapted to be clamped between the face of said cylindrical portion and said clamping-head, and said disk having means to engage the inner circumference of the gas-main for unscrewing or screwing the same, substantially as described.

3. A chuck for unscrewing and screwing gas-mains, having a cylindrical portion, the face of which is provided with recesses, a clamping-head having corresponding recesses, a disk adapted to be clamped between said head and the face of said cylindrical portion, recesses in the cylindrical portion of said disk, the faces of which being adapted to register with the recesses in the face of the cylindrical portion and recesses in the clamping-head, toothed sliding blocks mounted in the recesses of said disk, the ribs of which are adapted to engage the recesses of the face of the cylindrical portion and the face of the clamping-head, substantially as specified.

4. In a device of the character described, the same comprising, in combination with a common knuckle, a swinging shaft, and a chuck, comprising a swiveled collar, having suitable handles, a cylindrical portion projecting from one side of said chuck, having a face thereon, a clamping-head, a disk adapted to be clamped between the face of said cylindrical portion and said clamping-head, means carried by said disk to engage the inner circumference of a gas-main, and means carried by the clamping-head and the face of the cylindrical portion to coöperate with said first-named means, substantially as specified.

In testimony whereof I have hereto affixed my signature in the presence of two witnesses.

THOMAS H. CRAWFORD.

Witnesses:
GEO. W. HOOVER,
WILL BRANDT.